United States Patent
Sugiyama (10) Patent No.: US 8,292,014 B2
(45) Date of Patent: Oct. 23, 2012

(54) GRILLE DEVICE FOR VEHICLE

(75) Inventor: Yohei Sugiyama, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 344 days.

(21) Appl. No.: 12/730,501

(22) Filed: Mar. 24, 2010

(65) Prior Publication Data
US 2010/0282533 A1 Nov. 11, 2010

(30) Foreign Application Priority Data
May 7, 2009 (JP) .............................. P. 2009-112778

(51) Int. Cl.
*B60K 11/06* (2006.01)
*F01P 7/02* (2006.01)
(52) U.S. Cl. ..................................... 180/68.1; 123/41.06
(58) Field of Classification Search .................. 180/68.1, 180/68.2, 68.3, 68.4, 68.6; 123/41.04, 41.05, 123/41.06; 296/193.1
See application file for complete search history.

(56) References Cited

U.S. PATENT DOCUMENTS

| | | | | |
|---|---|---|---|---|
| 4,475,485 A | * | 10/1984 | Sakakibara et al. | 123/41.05 |
| 4,779,577 A | * | 10/1988 | Ritter et al. | 123/41.05 |
| 5,125,714 A | * | 6/1992 | Lecher | 296/180.5 |
| 6,588,380 B2 | * | 7/2003 | Ries-Mueller | 123/41.05 |
| 6,854,544 B2 | * | 2/2005 | Vide | 180/68.6 |
| 8,118,124 B2 | * | 2/2012 | Shin et al. | 180/68.1 |
| 8,136,487 B2 | * | 3/2012 | Bernt et al. | 123/41.05 |
| 2006/0095178 A1 | * | 5/2006 | Guilfoyle et al. | 701/36 |
| 2011/0120395 A1 | * | 5/2011 | Kim | 123/41.05 |

FOREIGN PATENT DOCUMENTS
JP 2008-6855 A 1/2008
* cited by examiner

*Primary Examiner* — Frank Vanaman
(74) *Attorney, Agent, or Firm* — Buchanan Ingersoll & Rooney PC (57) ABSTRACT

A grille device for a vehicle includes an adjustment member provided to be movable between a block position and a permission position for blocking and permitting intake of air into a radiator, respectively; a motor which moves the adjustment member; a battery for the motor; an electric generator which generates electric power for the battery; a motor controller which moves the adjustment member; and a grille controller which performs a first control for adjusting an air intake amount into the radiator and a second control for compulsorily moving the adjustment member to the permission position. The grille controller stops the first control and performs the second control when an output voltage of the battery becomes a voltage value outside a predetermined range and otherwise when an amount of power generation by the electric generator becomes smaller than a set minimum amount of power generation.

6 Claims, 7 Drawing Sheets

GRILLE DEVICE FOR VEHICLE

CROSS REFERENCE TO RELATED APPLICATIONS

This application is based on and claims priority under 35 U.S.C. §119 to Japanese Patent Application 2009-112778, filed on May 7, 2009, the entire content of which is incorporated herein by reference.

TECHNICAL FIELD

The disclosure relates to a grille device for a vehicle, more particularly, to a grille device including an adjustment member which is provided in an air intake path for taking an air from the front of the vehicle into a radiator to be movable between a block position for blocking the intake of air into the radiator and a permission position for permitting the intake of air into the radiator; an electric motor which moves the adjustment member; a battery for supplying electric power to the electric motor; an electric generator operated by a vehicle drive engine to generate the electric power to be charged in the battery; a motor controller which moves the adjustment member between the block position and the permission position by energizing the electric motor; and a grille controller which controls the opening and closing of the grille to adjust the amount of air intake into the radiator by moving the adjustment member between the block position and the permission position.

BACKGROUND DISCUSSION

As an example of an adjustment member in a grille device of a vehicle, a movable fin is provided to adjust the amount of air intake into a radiator so as to maintain a cooling temperature by the radiator within a predetermined temperature range, and also adjust the amount of air intake into an engine room through the radiator so as to adjust the aerodynamic characteristics of the vehicle.

The movable fin is provided in an air intake path which takes in air from the front of the vehicle into the radiator to be movable between a block position for blocking the intake of air to the radiator and a permission position for permitting the intake of air to the radiator.

The grille device for a vehicle is provided with a grille controller that controls the opening and closing of the grille by moving the movable fin between the block position and the permission position by the operation of the motor controller.

The controlling of the opening and closing of the grille adjusts the amount of air intake into the radiator so as to maintain the cooling temperature by the radiator within the predetermined temperature range, and adjusts the amount of air intake into the engine room through the radiator so that the aerodynamic characteristics, such as desired air resistance, lift force, down force, or the like, can be provided to the vehicle.

The related-art controlling of the opening and closing of the grille starts when the vehicle starts traveling after the engine is started by a turning-on operation of an ignition switch, and ends when the engine is stopped by a turning-off operation of the ignition switch (for example, JP2008-6855A).

That is, during a time period from a time when the engine is started to a time when the vehicle starts traveling, the controlling of the opening and closing of the grille is not performed.

If the controlling of the opening and closing of the grille ends, and if the movable fin is in the block position, during the time period from the time when the engine is started to the time when the vehicle starts traveling, the controlling of the opening and closing of the grille might be not performed. Accordingly, in order to prevent overheating of the engine during this time period, an end process for moving the movable fin to the permission position is performed after the end of the controlling of the opening and closing of the grille.

After the end of the controlling of the opening and closing of the grille, the engine is stopped, and therefore, power generation by an electric generator is not performed. Accordingly, if an output voltage of a battery is lower than a startup voltage of the electric motor for moving the movable fin, the movable fin could not be moved to the permission position even though the electric motor is turned on in the end process.

Accordingly, when the movable fin is stopped in the block position at the end of the controlling of the opening and closing of the grille, and also the output voltage of the battery is lower than the startup voltage of the electric motor for moving the movable fin, the overheating of the engine could not be prevented during the time period from a time when the engine is started at a next time to a time when the vehicle starts traveling.

Also, when the power generation capability of the electric generator is deteriorated, the battery could not be charged sufficiently. Therefore, if the output voltage of the battery is lower than the startup voltage of the electric motor during the execution of the controlling of the opening and closing of the grille, the movable fin could not be moved even though the electric motor is turned on.

Accordingly, when the movable fin is stopped in the block position during the execution of the controlling of the opening and closing of the grille, i.e. during the traveling of the vehicle, and when the output voltage of the battery is lower than the startup voltage of the electric motor for moving the movable fin due to the deterioration of the power generation capability of the electric generator, the overheating of the engine could not be prevented.

Further, if the output voltage of the battery is abnormally heightened during the execution of the controlling of the opening and closing of the grille, a negative influence might be caused on the normal control operation of the motor controller or the grille controller which are operated by the electric power from the battery.

In this case, the control operation for moving the movable fin, which is stopped in the block position, to the permission position is not normally performed, and therefore, the engine could be overheated.

A need thus exists for a grille device for a vehicle which is not susceptible to the drawback mentioned above.

SUMMARY

According to an aspect of this disclosure a grille device for a vehicle comprising: an adjustment member provided in an intake path for taking an air from a front of a vehicle into a radiator to be movable between a block position for blocking the intake of air into the radiator and a permission position for permitting the intake of air into the radiator; an electric motor configured to move the adjustment member; a battery configured to supply electric power to the electric motor; an electric generator configured to be operated by a vehicle drive engine to generate electric power to be charged in the battery; a motor controller configured to move the adjustment member to either one of the block position and the permission position by energizing the electric motor to adjust an amount of air intake into the radiator; and a grille controller configured to perform a grille opening and closing control for causing the motor controller to adjust the amount of air intake into the radiator and a compulsory movement control for causing the motor controller to compulsorily move the adjustment member to the permission position, wherein the grille controller stops performing the grille opening and closing control and performs the compulsory movement control when an output voltage of the battery becomes a voltage value outside a range between a set minimum voltage and a set maximum voltage during performing of the grille opening and closing control and otherwise when an amount of power generation by the electric generator becomes smaller than a set minimum amount of power generation during performing of the grille opening and closing control.

DETAILED DESCRIPTION

The foregoing and additional features and characteristics of this disclosure will become more apparent from the following detailed description considered with the reference to the accompanying drawings, wherein.

DETAILED DESCRIPTION

Illustrative embodiments disclosed here will be explained with reference to the attached drawings.

First Illustrative Embodiment

Figure 1:
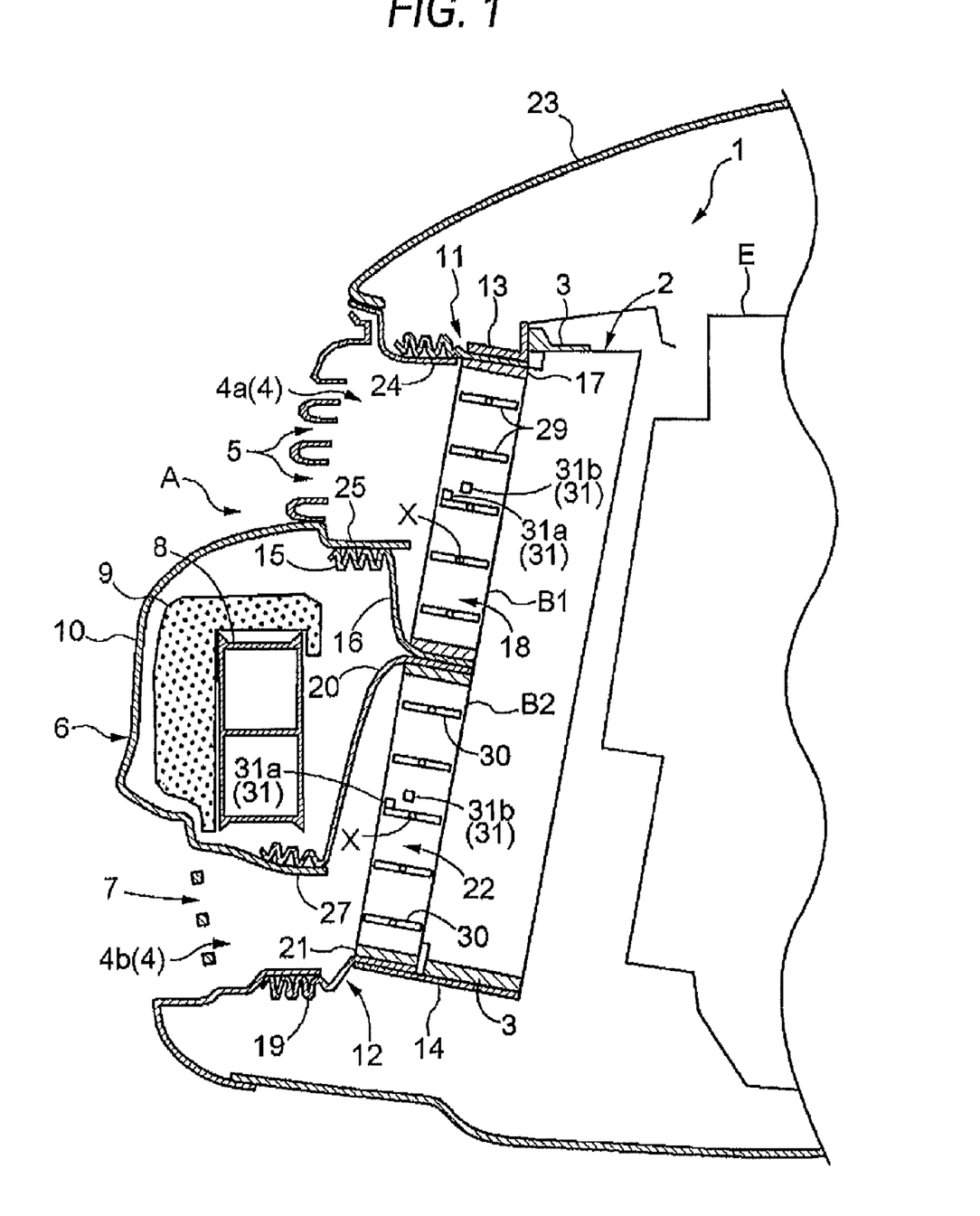
FIG. 1 is a side view illustrating the inside of an engine room of a vehicle wherein a movable fin is in a permission position.
Figure 2:
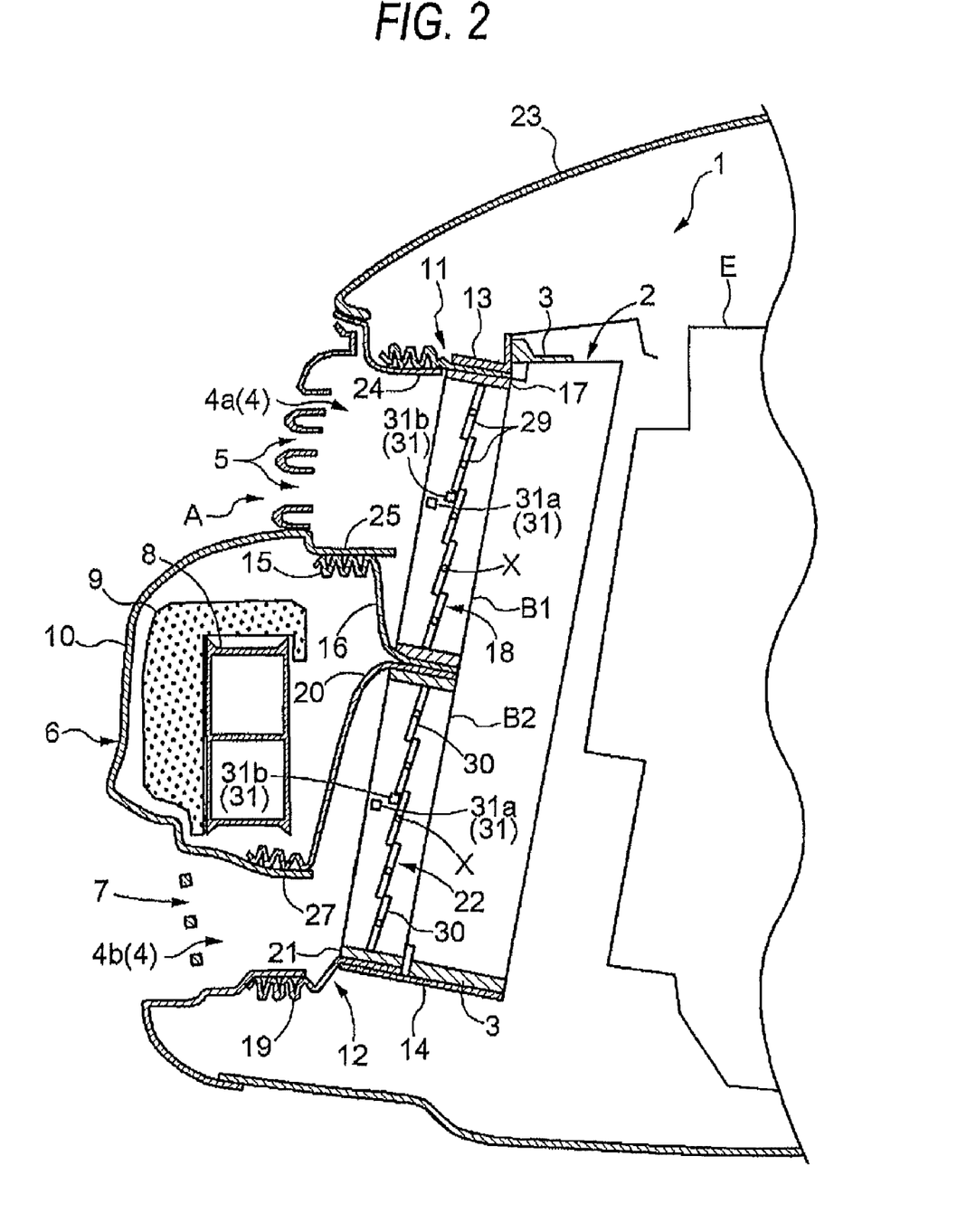
FIG. 2 is a side view illustrating the inside of the engine room of the vehicle wherein a movable fin is in a block position.

FIG. 1 and FIG. 2 show the inside of an engine room 1 that is provided at a front-side part of a vehicle. In the engine room 1, a vehicle drive engine E and a radiator 2 for cooling engine cooling water are provided. The radiator 2 is installed on a vehicle body 3.

On the front side of the radiator 2, a grille device A for a vehicle according to a first illustrative embodiment disclosed here is provided for taking air from the front of the vehicle into the radiator 2.

The grille device A includes an air intake path 4. The air intake path 4 includes a first air intake path 4a and a second air intake path 4b.

The first air intake path 4a is provided to take air from the front of the vehicle to an upper part of the front surface of the radiator 2, and is provided with a first grille opening 5 formed on a grille design part. The second air intake path 4b is provided to take air from the front of the vehicle to a lower part of the front surface of the radiator 2, and is provided with a second grille opening 7 formed on a bumper 6.

In front of the radiator 2, a bumper stiffener 8 attached to the vehicle body 3 is provided between the first grille opening 5 and the second grille opening 7. On the bumper stiffener 8, a foam buffer 9 is provided, which is covered by a resin cover 10 of the bumper 6.

In front of the radiator 2, a first housing 11 and a second housing 12 are provided in the upper-lower direction. The first housing 11 and the second housing 12 are attached to the vehicle body 3 through brackets 13 and 14, respectively.

The first housing 11 is provided with a first main body frame 16 having a first corrugated portion 15 formed on the front end thereof and a first housing frame 17 fixed to the inside of the first main body frame 16.

Inside of the first housing frame 17, a first air flow path 18 having a substantially rectangular cross section which is long in a vehicle width direction is formed to surround the upper part of the front surface of the radiator 2.

The second housing 12 is provided with a second main body frame 20 having a second corrugated portion 19 formed on the front end thereof and a second housing frame 21 fixed to the inside of the second main body frame 20.

Inside of the second housing frame 21, a second air flow path 22 having substantially rectangular cross section which is long in the vehicle width direction is formed to surround the lower part of the front surface of the radiator 2.

A wall material 24 that extends from a bonnet surrounding member 23 is bonded to the upper part of the inside of the first corrugated portion 15, and an upper wall 25 of the bumper 6 is bonded to the lower part of the inside thereof. Accordingly, the first air intake path 4a is formed that extends from the first grille opening 5 to the upper part of the front surface of the radiator 2 through the first air flow path 18.

Inside of the second corrugated portion 19, an opening end part 27 formed in the second grille opening 7 is inserted. Accordingly, the second air intake path 4b is formed which extends from the second grille opening 7 to the lower part of the front surface of the radiator 2 through the second air flow path 22.

In the inner periphery sides of the first housing frame 17 and the second housing frame 21, i.e. in the first air flow path 18 of the first air intake path 4a and the second air flow path 22 of the second air intake path 4b, a first shutter device B1 and a second shutter device B2 are provided which have adjustment members 29 and 30 for respectively adjusting the amount of air intake into the radiator 2, respectively.

The first shutter device B1 is provided with a plurality of first movable fins 29 as an example of an adjustment member arranged in the upper-lower direction at a predetermined interval in the first air flow path 18, and a first DC electric motor M1 having a reduction gear (not shown) for rotatably moving each first movable fin 29 about a horizontal-axis shaft X along the vehicle width direction.

The second shutter device B2 is provided with a plurality of second movable fins 30 as an example of an adjustment member arranged in the upper-lower direction at a predetermined interval in the second air flow path 22, and a second DC electric motor M2 having a reduction gear (not shown) for rotatably moving each second movable fin 30 about a horizontal-axis shaft X along the vehicle width direction.

Both end parts of the first movable fins 29 are rotatably supported by both frame parts of the first housing frame 17, and both end parts of the second movable fins 30 are rotatably supported by both frame parts of the second housing frame 21.

The first movable fins 29 and the second movable fins 30 are provided rotatably between a permission position (i.e. completely open position) that permits the intake of air into the radiator and the intake of the air having passed through the radiator 2 into the engine room 1 as shown in FIG. 1 and a block position (i.e. completely closed position) that blocks the intake of the air into the radiator 2 and the intake of the air having passed through the radiator 2 into the engine room 1 as shown in FIG. 2.

The rotatable movement range between the two positions, i.e. the permission position (i.e. completely open position) and the block position (i.e. completely closed position), of the first movable fins 29 and the second movable fins 30 are set as a set movable range.

By rotatably moving the first movable fins 29 and the second movable fins 30 from one end to the other end of the set movement range, the amount of air intake form the front of the vehicle into the radiator and the amount of air intake passing through the radiator 2 to the engine room 1 can be adjusted.

The first electric motor M1 and the second electric motor M2 are rotated by the power supplied from a vehicle battery (not shown). An electric generator (not shown) that is operated by the engine E is provided to generate an electric power to be charged in the battery.

In the side housing parts of the first housing frame 17 and the second housing frame 21, there is provided regulating section 31 which are protrusion for regulating the movement that exceeds the set movement range of the whole first movable fins 29 and the whole second movable fins 30 by the contact with one of the first movable fins 29 and one of the second movable fins 30, respectively.

The regulating section 31 includes a first regulating member 31a and a second regulating member 31b which are protrusion.

The first regulating member 31a regulates the rotatable movement that exceeds the permission position (i.e. completely open position) of the whole first movable fins 29 or the whole second movable fins 30 by the contact with one of the first movable fins 29 or one of the second movable fins 30 in the permission position (i.e. completely open position).

The second regulating member 31b regulates the rotatable movement that exceeds the block position (i.e. completely closed position) of the whole first movable fins 29 or the whole second movable fins 30 by the contact with one of the first movable fins 29 or one of the second movable fins 30 in the block position (i.e. completely closed position).

As shown in FIG. 1, the first movable fins 29 and the second movable fins 30 are rotated in parallel at an angle position according to a flow length direction of the first air flow path 18 or the second air flow path 22 in the permission position (i.e. completely open position) to open the first air flow path 18 and the second air flow path 22.

As shown in FIG. 2, the first movable fins 29 and the second movable fins 30 are rotated to reach positions where adjacent end portions of the first movable fins 29 or adjacent end portions of the second movable fins 30 approach one another in the block position (i.e. completely closed position) to close the first air flow path 18 or the second air flow path 22.

By rotatably moving the first movable fins 29 or the second movable fins 30 to either of the permission position (i.e. completely open position) and the block position (i.e. completely closed position), the amount of air intake from the front of the traveling vehicle to the radiator 2 and the amount of air intake to the engine room 1 through the radiator 2 can be adjusted.

Accordingly, the first movable fins 29 and the second movable fins 30 also serve as an adjustment member that adjusts the aerodynamic characteristics of the vehicle according to their positional change, and are configured to secure the stable traveling state by providing desired air resistance, lift force, or down force to the traveling vehicle through the adjustment of the amount of air intake from the front of the vehicle to the engine room 1 via the radiator 2.

Specifically, by rotatably moving the first movable fins 29 and the second movable fins 30 to the block position (i.e. completely closed position), the air resistance (i.e. air resistance coefficient) and the lift force become smaller, the air from the front part of the vehicle flows to the lower part of a floor surface, and the down force that draws the vehicle in lower direction is generated.

In contrast, by rotatably moving the first movable fins 29 and the second movable fins 30 to the permission position (i.e. completely open position), the air resistance becomes larger and the pressure inside the engine room 1 is increased by the air taken into the engine room 1 and the lift force is increased.

Even at the constant traveling speed, the size of the generated air resistance, lift force, and the down force can be adjusted by changing combinations of the close or open position of the first movable fins 29 (i.e. completely closed or open position) and the close or open position of the second movable fins 30 (i.e. completely closed or open position).

Figure 3:
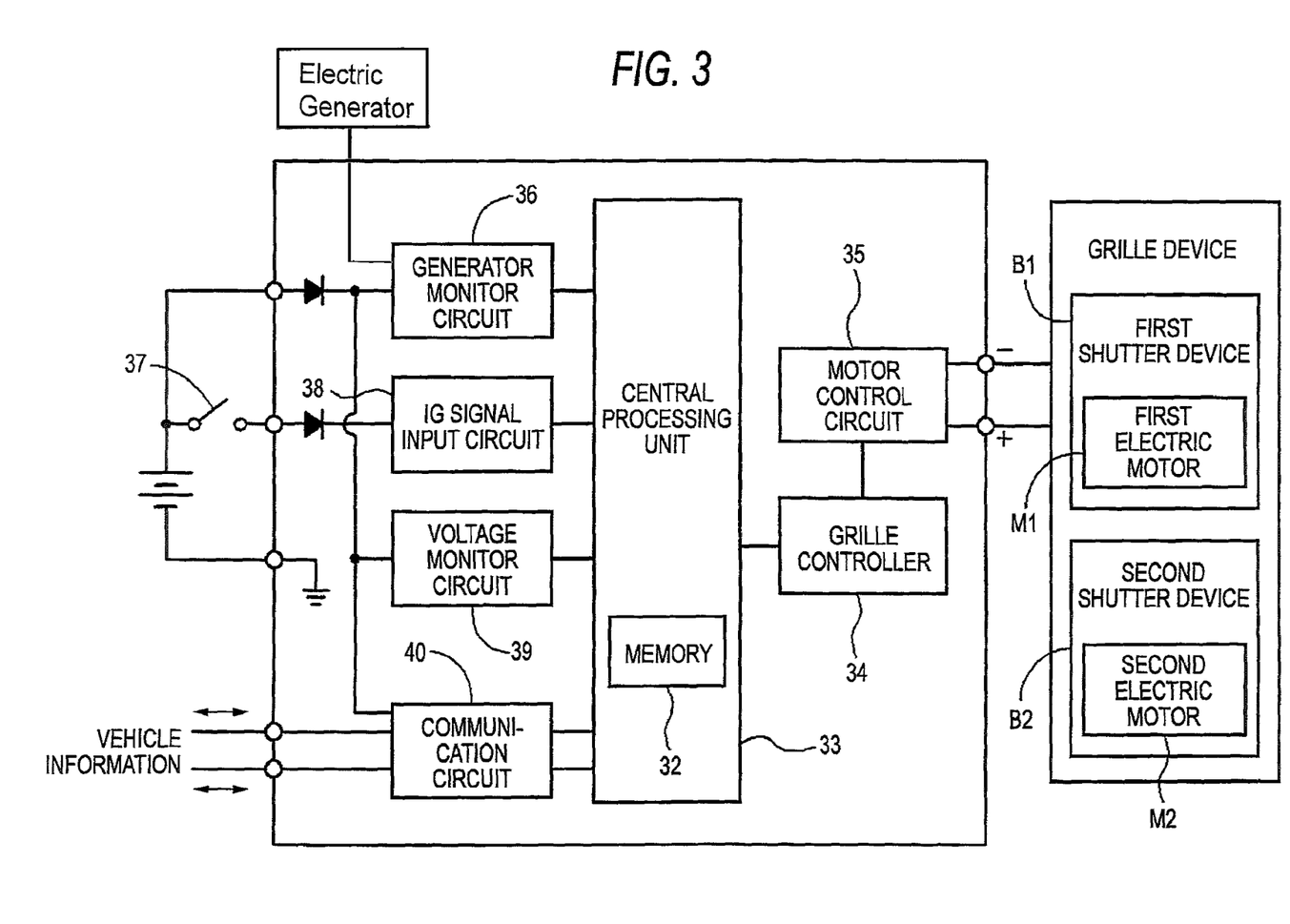
FIG. 3 is a system block diagram of a grille device for a vehicle.

FIG. 3 is a system block diagram of the grille device A. The grille device A includes a central processing unit 33 having a memory 32, a grille controller (grille control means) 34, and a motor control circuit (motor controller or motor control means) 35.

The central processing unit 33 is connected with a generator monitor circuit 36 that monitors the amount of power generation of the electric generator, an IG signal input circuit 38 that inputs a signal indicating an on/off manipulation of an ignition switch 37, a voltage monitor circuit 39 that monitors the output voltage of the battery, and a communication circuit 40 that receives cooling water temperature information of the radiator 2 and vehicle information such as vehicle traveling start information or the like.

The central processing unit 33, the grille controller 34, the motor control circuit 35, the generator monitor circuit 36, the IG signal input circuit 38, the voltage monitor circuit 39, and the communication circuit 40 are electric circuits used in the vehicle, and are operated by the power of the same battery as the battery that supplies the driving power to the first electric motor M1 and the second electric motor M2.

In the memory 32, the set minimum voltage Vmin, the set maximum voltage Vmax, and the set minimum amount of power generation Wmin are stored.

As the set minimum voltage Vmin, the minimum output voltage of the battery, which is set to be equal to or higher than the minimum voltage value necessary for the first electric motor M1 or the second electric motor M2 to move the first movable fins 29 or the second movable fins 30 to the permission position.

As the set maximum voltage Vmax, the permissive maximum voltage of the battery which is equal to or lower than the permissive voltage value of the electric circuits used in the vehicle, and specifically, which does not exert a negative influence on the control operation of the central processing unit 33 or the grille controller 34.

As the set maximum amount of power generation Wmin, the minimum amount of power generation is set to be equal to or larger than the amount of power generation necessary to drive the first electric motor M1 and the second electric motor M2, i.e. which can secure the set minimum voltage Vmin that is considered to be at least necessary for the first electric motor M1 or the second electric motor M2 to move the first movable fins 29 or the second movable fins 30 to the permission position.

If a turning-on command, has been input from the grille controller 34, the motor control unit 35 moves the first movable fins 29 or the second movable fins 30 to the block position or the permission position by energizing the first electric motor M1 or the second electric motor M2 for a predetermined time.

The grille controller 34 performs a grille opening and closing control for adjusting the amount of air intake into the radiator 2 by moving the first movable fins 29 or the second movable fins 30 to the block position or the permission position by outputting a energizing command to the motor control circuit 35, and performs compulsory movement control for compulsorily moving the first movable fins 29 and the second movable fins 30 to the permission position by outputting the energizing command to the motor control circuit 35.

Figure 4:
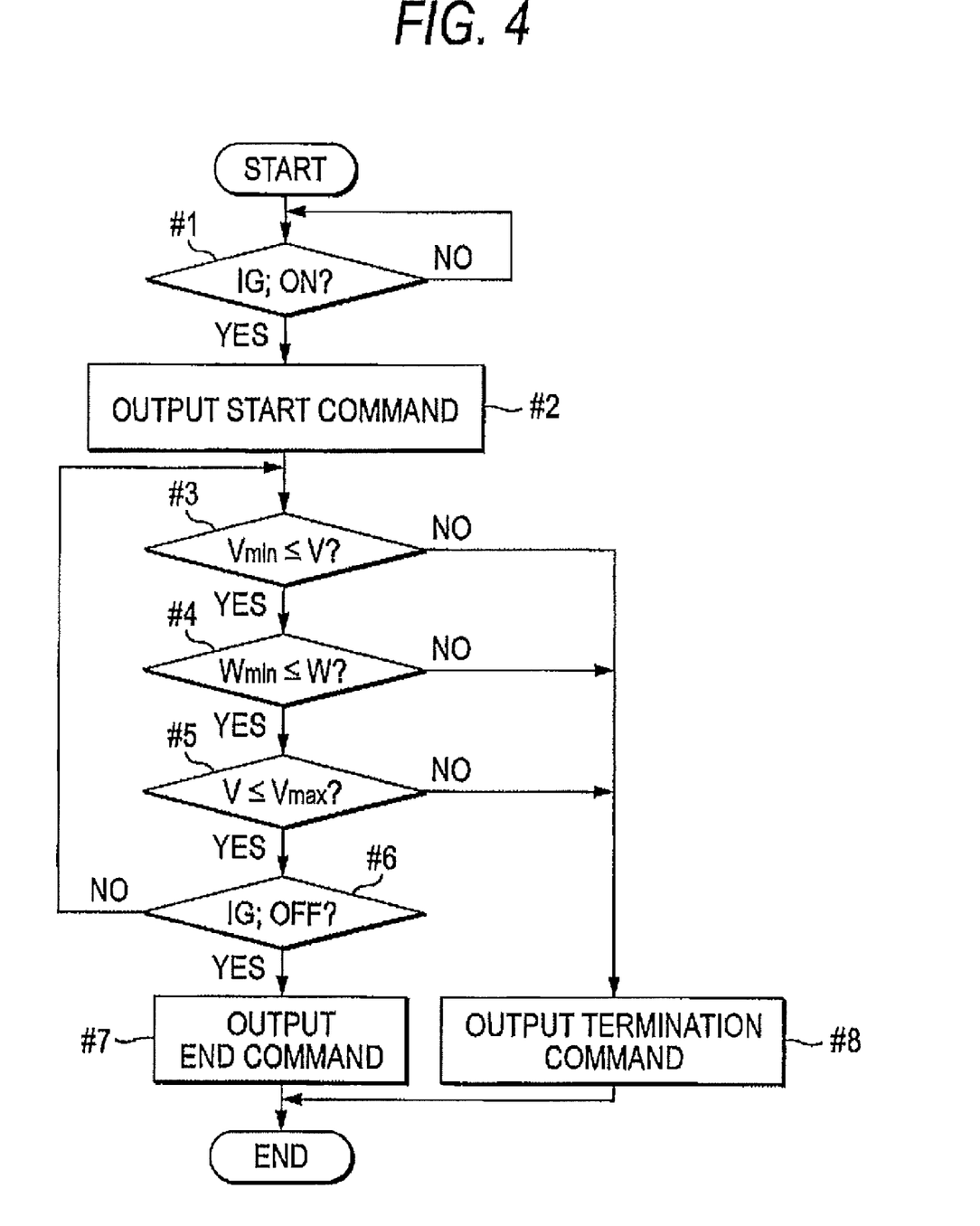
FIG. 4 is a flowchart illustrating the control performed by a central processing unit according to a first illustrative embodiment disclosed here.

The control operation of the central processing unit 33 will be described with reference to the flowchart of FIG. 4.

If a signal that indicates the turning-on operation of the ignition switch 37 has been input from the IG signal input circuit 38, a start command of the grille opening and closing control is output to the grille controller 34 (steps #1 and #2).

That is, if the engine E is started, the grille controller 34 starts performing the grille opening and closing control without waiting for the vehicle to start traveling.

In performing the grille opening and closing control, before the vehicle starts traveling, for example, when the outside air temperature is lower than a set temperature, the first movable fins 29 or the second movable fins 30 are moved to the block position so that the engine E becomes warmer quickly.

After the start command for the grille opening and closing control is output to the grille controller 34, that is, during performing of the grille opening and closing control, if it is determined that the output voltage V of the battery is less than the set minimum voltage Vmin based on the input signal from the voltage monitor circuit 39, if the amount of electricity generation W by the electric generator is less than the set minimum amount of electricity generation Wmin based on the input signal from the generator monitor circuit 36, or if it is determined that the output voltage V of the battery exceeds the set maximum voltage Vmax based on the input signal from the voltage monitor circuit 39, a termination command for the grille opening and closing control is output to the grille controller 34, and ends the control operation (steps #3, #4, #5, and #8).

The output voltage V of the battery exceeds the set maximum voltage Vmax, when an imaginary short occurs. That is, when it is difficult to start the engine E due to the running out of the battery or the like, the engine E is started by connecting a battery of another vehicle. In this case, since the two batteries are directly connected together, the voltage value becomes about doubled.

If the output voltage V of the battery is equal to or higher than the set minimum voltage Vmin or is equal to or lower than the set maximum voltage Vmax, and the amount of electricity generation W is equal to or larger than the set minimum amount Wmin of electricity generation, the grille opening and closing control is performed (steps #3, #4, #5, and #6) until the signal that indicates the turning-off operation of the ignition switch 37 is input to the IG signal input circuit 38. If the signal that indicates the turning-off operation is input, an end command for the controlling of the grille opening and closing control is output to the grille controller 34, and the control operation ends (step #7).

Figure 5:
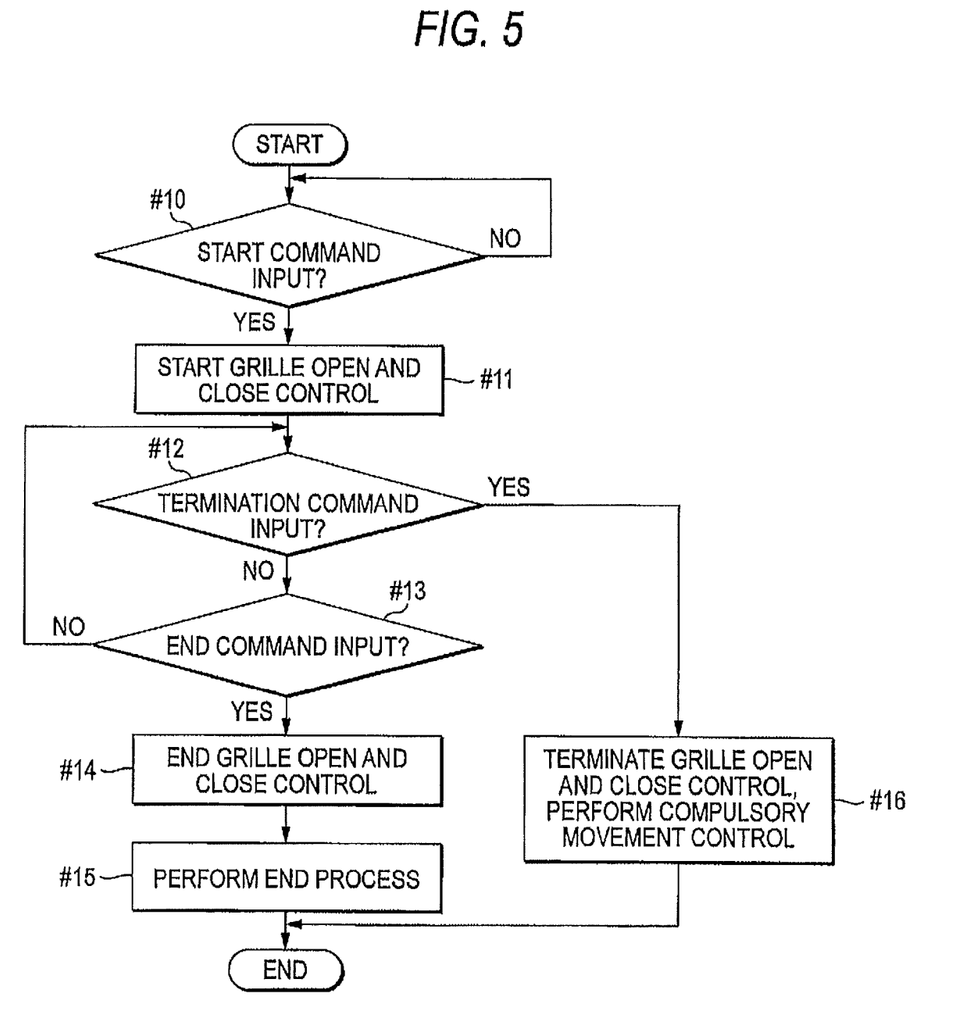
FIG. 5 is a flowchart illustrating the control performed by a grille controller according to the first illustrative embodiment disclosed here.

The control operation of the grille controller 34 will be described with reference to the flowchart of FIG. 5.

If the start command for the grille opening and closing control is input from the central processing unit 33, the grille opening and closing control is started (steps #10 and #11).

If the end command for the grille opening and closing control is input from the central processing unit 33, the grille opening and closing control is terminated as well as the termination of the grille opening and closing control is displayed on a display panel or the like, and the compulsory movement control is performed (steps #12 and #16). Then, the control operation ends.

If the compulsory movement control is performed when it is determined that the output voltage V of the battery is lower than the set minimum voltage Vmin or when it is determined that the amount of electricity generation W by the electric generator is smaller than the set minimum amount of electricity generation Wmin, the rotating torque of the first electric motor M1 or the second electric motor M2 when the compulsory movement control is performed becomes smaller than that in a normal state where the output voltage V of the battery is equal to or higher than the set minimum voltage Vmin or the amount of electricity generation W by the electric generator is equal to or higher than the set minimum amount of electricity generation Wmin.

Accordingly, in performing the compulsory movement control when it is determined that the output voltage V of the battery is lower than the set minimum voltage Vmin or when it is determined that the amount of electricity generation W by the electric generator is smaller than the set minimum amount of electricity generation Wmin, the first electric motor M1 or the second electric motor M2 is energized for a period that is longer than a predetermined energizing time of the first electric motor M1 or the second electric motor M2 in the process for the grille opening and closing control, so that the first movable fins 29 or the second movable fins 30 are surely moved from the block position to the permission position.

The grille opening and closing control is performed until the end command for the grille opening and closing control is input from the central processing unit 33, and if the end command is input, the grille opening and closing control ends (steps #13 and #14).

If the grille opening and closing control ends when the output voltage V of the battery is equal to or higher than the set minimum voltage Vmin and is equal to or lower than the set maximum voltage Vmax, or when the amount of electricity generation W is equal to or larger than the set minimum amount of electricity generation Wmin, there is a possibility that the first movable fins 29 or the second movable fins 30 are stopped in the block position.

Accordingly, if the first movable fins 29 or the second movable fins 30 are stopped in the block position when the grille opening and closing control ends, the end process which moves the first movable fins 29 or the second movable fins 30 to the permission position is performed by energizing the first electric motor M1 or the second electric motor M2 for the predetermined time after the end of the grille opening and closing control, and then the control operation is ended (step #15).

Second Illustrative Embodiment

Figure 6:
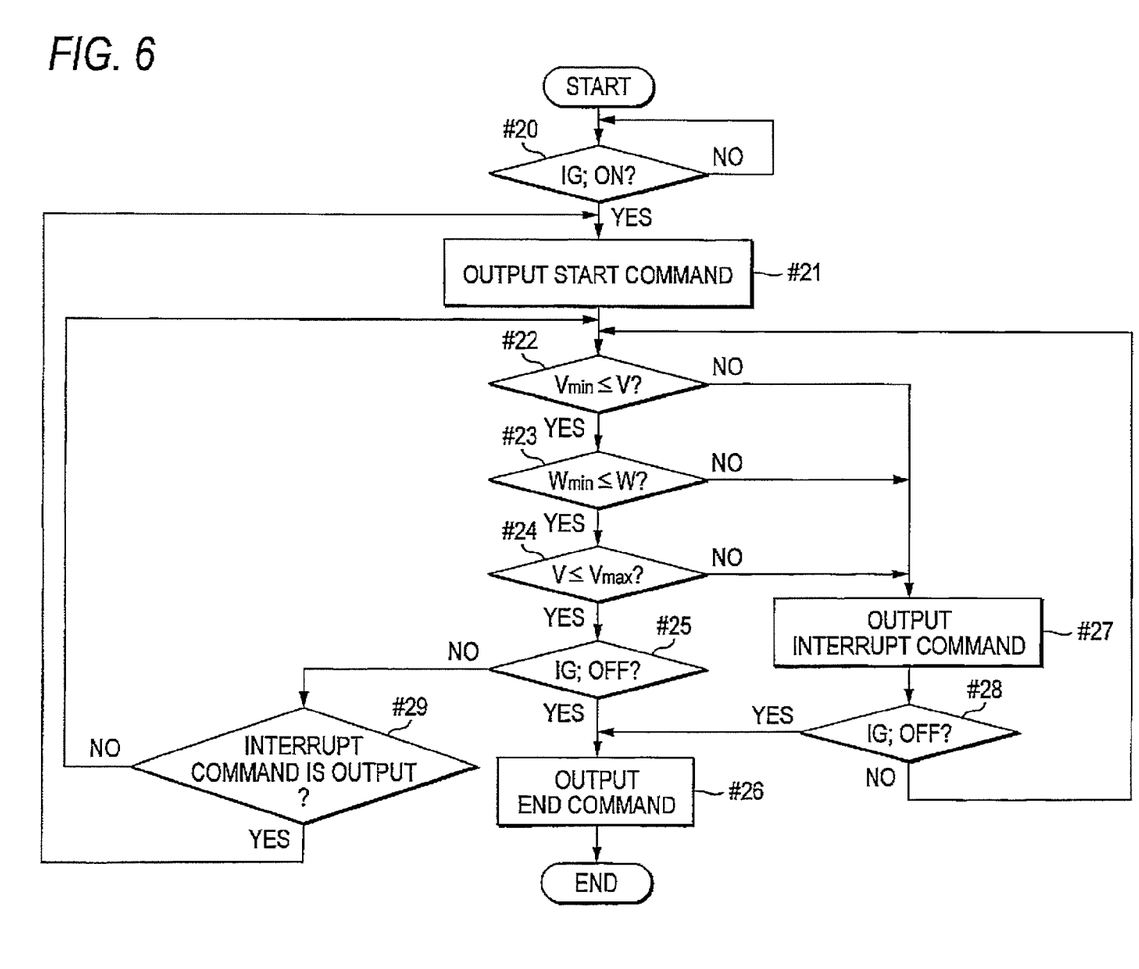
FIG. 6 is a flowchart illustrating the control performed by a central processing unit according to a second illustrative embodiment disclosed here.
Figure 7:
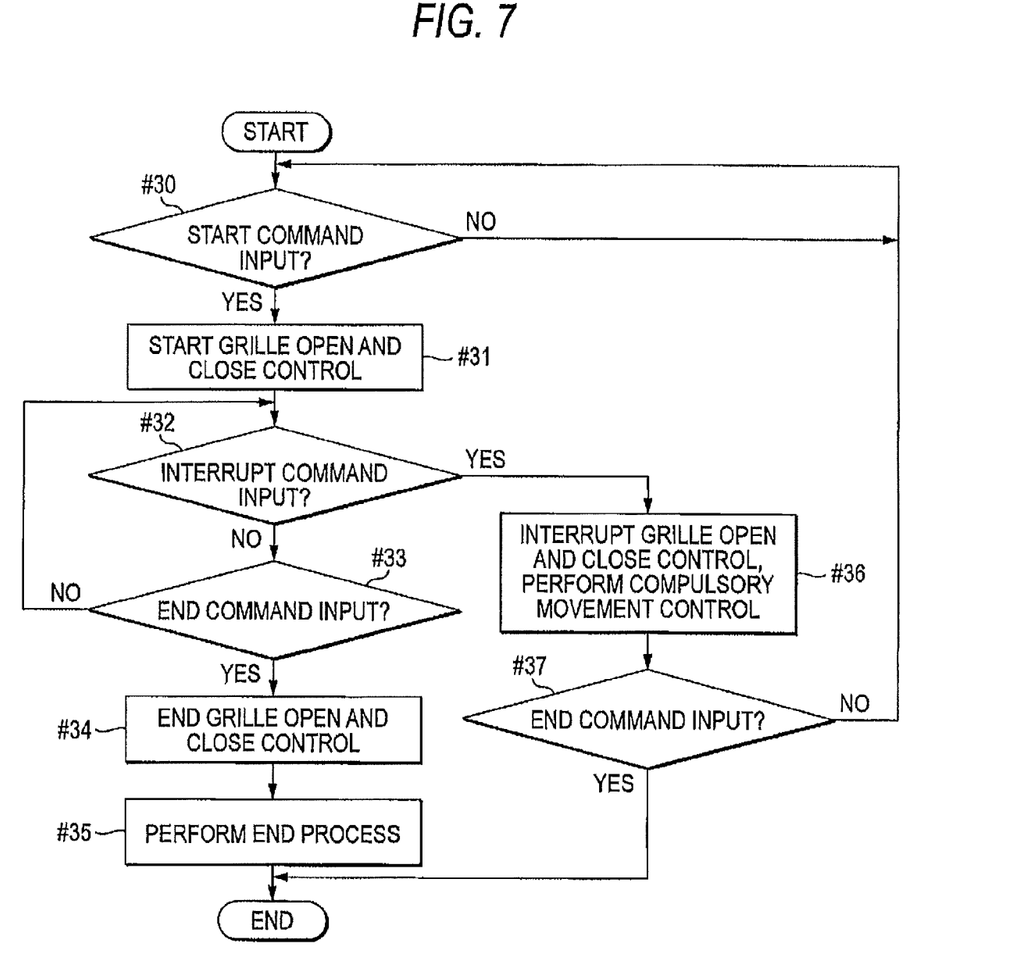
FIG. 7 is a flowchart illustrating the control preformed by a grille controller according to the second illustrative embodiment disclosed here.

The flowcharts of FIGS. 6 and 7 show the control operation by the central processing unit 33 and the control operation by the grille controller 34 in the grille device according to a second illustrative embodiment disclosed here.

The control operation by the central processing unit 33 is as shown in the flowchart of FIG. 6. If a signal that indicates the turning-on operation of the ignition switch 37 is input from the IG signal input circuit 38, the start command for the grille opening and closing control is output to the grille controller 34 (steps #20 and #21).

After the start command for the grille opening and closing control is output to the grille controller 34, that is, during performing of the grille opening and closing control, if it is determined that the output voltage V of the battery is less than the set minimum voltage Vmin based on the input signal from the voltage monitor circuit 39 (step #22), if it is determined that the amount of electricity generation W by the electric generator is less than the set minimum amount of electricity generation Wmin based on the input signal from the generator monitor circuit 36 (step #23), or if it is determined that the output voltage V of the battery exceeds the set maximum voltage Vmax based on the input signal from the voltage monitor circuit 39 (step #24), an interrupt command for the grille opening and closing control is output to the grille controller 34 (step #27).

If the output voltage V of the battery is equal to or higher than the set minimum voltage Vmin or is equal to or lower than the set maximum voltage Vmax, and the amount of electricity generation W is equal to or larger than the set minimum amount of electricity generation Wmin, the grille opening and closing control is performed until the signal that indicates the turning-off operation of the ignition switch 37 is input to the IG signal input circuit 38. If the signal that indicates the turn-off operation is input (steps #22, #23, #24, and #25), an end command for the grille opening and closing control is output to the grille controller 34, and the control operation ends (step #26).

If the signal that indicates the turning-off operation of the ignition switch 37 is input from the IG signal input circuit 38 after the interrupt command is output to the grille controller 34, the end command for the grille opening and closing control is output to the grille controller 34, and the control operation ends (steps #27, #28, and #26).

If the signal that indicates the turning-off operation of the ignition switch 37 is not input from the IG signal input circuit 38 (steps #27 and #28) after an interrupt command is output to the grille controller 34, the processing returns to step #22. Then, if the signal that indicates the turning-off operation of the ignition switch 37 is not input from the IG signal input circuit 38 when the output voltage V of the battery is equal to or higher than the set minimum voltage Vmin and is equal to or lower than the set maximum voltage Vmax, and the amount of electricity generation W is equal to or larger than the set minimum amount of electricity generation Wmin (steps #22, #23, and #24), it is determined whether the interrupt command has been output in step #27. If the interrupt command has not been output, the processing returns to the step #22 (steps #25 and #29), whereas if the interrupt command has been output, the processing returns to the step #21, and the start command for the grille opening and closing control is output to the grille controller 34 (steps #25, #29, and #21).

That is, during the interruption of the grille opening and closing control, when the output voltage V of the battery is recovered to the set minimum voltage Vmin or more while the amount of electricity generation W by the electric generator is equal to or larger than the set minimum amount of electricity generation Wmin, or when the amount of electricity generation is recovered to the set minimum amount of electricity generation Wmin or more while the output voltage V of the battery is equal to or higher than the set minimum voltage Vmin, the start command (i.e. restart command) for the grille opening and closing control is output again.

The control operation of the grille controller 34 is shown in the flowchart of FIG. 7. If the start command for the grille opening and closing control is input from the central processing unit 33, the grille opening and closing control is started (steps #30 and #31).

If the interrupt command for the grille opening and closing control is input from the central processing unit 33, the grille opening and closing control is interrupted as well as the interruption of the grille opening and closing control is displayed on the display panel or the like, and the compulsory movement control is performed (steps #32 and #36). Thereafter, input of the end command for the grille opening and closing control from the central processing unit 33 is waited, and if the end command is input, the grille opening and closing control ends (step #37).

If the interrupt command for the grille opening and closing control is not input from the central processing unit 33 in step #32, the grille opening and closing control ends when the end command for the grille opening and closing control is input from the central processing unit 33 (steps #33 and #34), performs the end process, and ends the control operation (step #35).

If the end command for the grille opening and closing control is not input in step #37, the grille controller waits until the start command (i.e. restart command) for the grille opening and closing control is output again (step #30).

Other configurations are the same as those according to the first illustrative embodiment.

Other Illustrative Embodiments

1. The grille device according to an illustrative embodiment disclosed here may be provided with a setting change unit that can change the set minimum voltage, the set maximum voltage, or the set minimum amount of power generation.

2. The battery provided in the grille device according to an illustrative embodiment disclosed here may be a battery for a power supply of a driving source of a hybrid vehicle, the battery as the power supply of a cell motor or a headlight that is used during the startup of the engine.

3. The electric generator provided in the grille device according to an illustrative embodiment disclosed here may be an electric generator (i.e. an electric generator for a hybrid vehicle) that generates by a regenerative brake provided in the hybrid vehicle or an alternator that generates power based on the driving force of the engine.

This application discloses illustrative, non-limiting embodiments as follows:

A grille device for a vehicle comprises: an adjustment member provided in an intake path for taking an air from a front of a vehicle into a radiator to be movable between a block position for blocking the intake of air into the radiator and a permission position for permitting the intake of air into the radiator; an electric motor configured to move the adjustment member; a battery configured to supply electric power to the electric motor; an electric generator configured to be operated by a vehicle drive engine to generate electric power to be charged in the battery; a motor controller configured to move the adjustment member to either one of the block position and the permission position by energizing the electric motor to adjust an amount of air intake into the radiator; and a grille controller configured to perform a grille opening and closing control for causing the motor controller to adjust the amount of air intake into the radiator and a compulsory movement control for causing the motor controller to compulsorily move the adjustment member to the permission position, wherein the grille controller stops performing the grille opening and closing control and performs the compulsory movement control when an output voltage of the battery becomes a voltage value outside a range between a set minimum voltage and a set maximum voltage during performing of the grille opening and closing control and otherwise when an amount of power generation by the electric generator becomes smaller than a set minimum amount of power generation during performing of the grille opening and closing control.

According to the above configuration, the output voltage which is considered at least necessary to move the adjustment member to the permission position by the electric motor may be set as the minimum voltage, or the amount of power generation which can secure the output voltage of the battery that is considered at least necessary to move the adjustment member to the permission position by the electric motor may be set as the minimum amount of power generation.

Accordingly, if the output voltage of the battery becomes lower than the set minimum voltage or the amount of power generation of the electric generator becomes smaller than the set minimum amount of power generation during performing of the grille opening and closing control, that is, if the adjustment member is stopped in the block position in a state that the output voltage of the battery is lower than the startup voltage of the electric motor which moves the adjustment member, the adjustment member can not be moved to the permission position thereafter. In this case, the grille opening and closing control may be interrupted or terminated and the adjustment member may be compulsorily moved to the permission position.

Therefore, since the adjustment member has been already moved to the permission position even if the output voltage of the battery is lower than the startup voltage of the electric motor which moves the adjustment member when the grille opening and closing control ends, the overheating of the engine can be prevented during the time period from a time when the next startup of the engine starts to a time when the vehicle starts traveling.

Additionally, since the adjustment member has been already moved to the permission position even if the output voltage of the battery is lower than the startup voltage of the electric motor which moves the adjustment member when the grille opening and closing control is performed, i.e. during the traveling, the overheating of the engine can be prevented.

Further, by setting the maximum voltage that does not exert a bad influence on the control operation of the motor controller or the grille controller operated by the power of the battery as the set maximum voltage, the grille opening and closing control can be interrupted or terminated and the compulsory movement control can be performed when the output voltage of the battery exceeds the set maximum voltage during performing of the grille opening and closing control.

Accordingly, if the output voltage of the battery is abnormally heightened during performing of the grille opening and closing control and the control operation which moves the adjustment member which are stopped in the block position to the permission position is not normally performed to cause the overheating of the engine, the grille opening and closing control may be interrupted or terminated, and the adjustment member may be compulsorily moved to the permission position, so that the overheating of the engine can be prevented.

Therefore, when the grille opening and closing control ends or when the grille opening and closing control is being performed, overheating of the engine due to the abnormal state of the output voltage of the battery can be prevented.

In the above grille device, the set minimum voltage may be set to be equal to or higher than a minimum voltage necessary to drive the electric motor.

According to this configuration, the compulsory movement control can be surely performed by the grille controller even if the output voltage of the battery is at the set minimum voltage.

In the above grille device, the set maximum voltage may be set to be equal to or lower than a permissible voltage value of an electric circuit that is used in the vehicle.

According to this configuration, the compulsory movement control can be surely performed by the grille controller even if the output voltage of the battery is at the set maximum voltage.

In the above grille device, the set minimum amount of power generation may be set to be equal to or larger than an amount of power generation necessary to drive the electric motor.

According to this configuration, the compulsory movement control can be surely performed by the grille controller even if the amount of power generation by the electric generator is at the set minimum amount of power generation.

In the above grille device, the stopping of the grille opening and closing control may be an interruption of the grille opening and closing control, or may be a termination of the grille opening and closing control.

The principles, preferred embodiment and mode of operation of the present invention have been described in the foregoing specification. However, the invention which is intended to be protected is not be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within spirit and scope of the present invention as defined in the claims, be embraced thereby.

What is claimed is:

1. A grille device for a vehicle comprising:
    an adjustment member provided in an intake path along which air flows from a front of a vehicle into a radiator, the adjustment member being movable between a block position for blocking the intake of air into the radiator and a permission position for permitting the intake of air into the radiator;
    an electric motor configured to move the adjustment member;
    a battery configured to supply electric power to the electric motor;
    an electric generator configured to be operated by a vehicle drive engine to generate electric power to charge the battery;
    a motor controller configured to move the adjustment member to either one of the block position and the permission position by energizing the electric motor to adjust an amount of air intake into the radiator; and
    a grille controller configured to perform a grille opening and closing control for causing the motor controller to adjust the amount of air intake into the radiator and a compulsory movement control for causing the motor controller to compulsorily move the adjustment member to the permission position,
    wherein the grille controller stops performing the grille opening and closing control and performs the compulsory movement control when an output voltage of the battery becomes a voltage value outside a range between a set minimum voltage and a set maximum voltage during performing of the grille opening and closing control and otherwise when an amount of power generation by the electric generator becomes smaller than a set minimum amount of power generation during performing of the grille opening and closing control.

2. The grille device according to claim 1,
wherein the set minimum voltage is set to be equal to or higher than a minimum voltage necessary to drive the electric motor.

3. The grille device according to claim 1,
wherein the set maximum voltage is set to be equal to or lower than a permissible voltage value of an electric circuit that is used in the vehicle.

4. The grille device according to claim 1,
wherein the set minimum amount of power generation is set to be equal to or larger than an amount of power generation necessary to drive the electric motor.

5. The grille device according to claim 1,
wherein the stopping of the grille opening and closing control is an interruption of the grille opening and closing control.

6. The grille device according to claim 1,
wherein the stopping of the grille opening and closing control is a termination of the grille opening and closing control.

* * * * *